J. L. Wells,
Hay Fork.
No. 44,682.  Patented. Oct 11 1864.
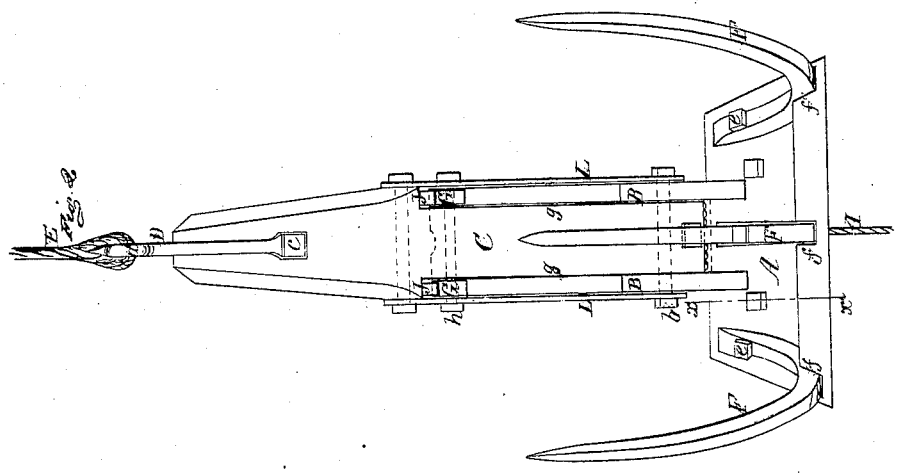
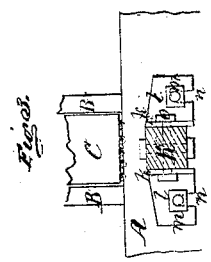
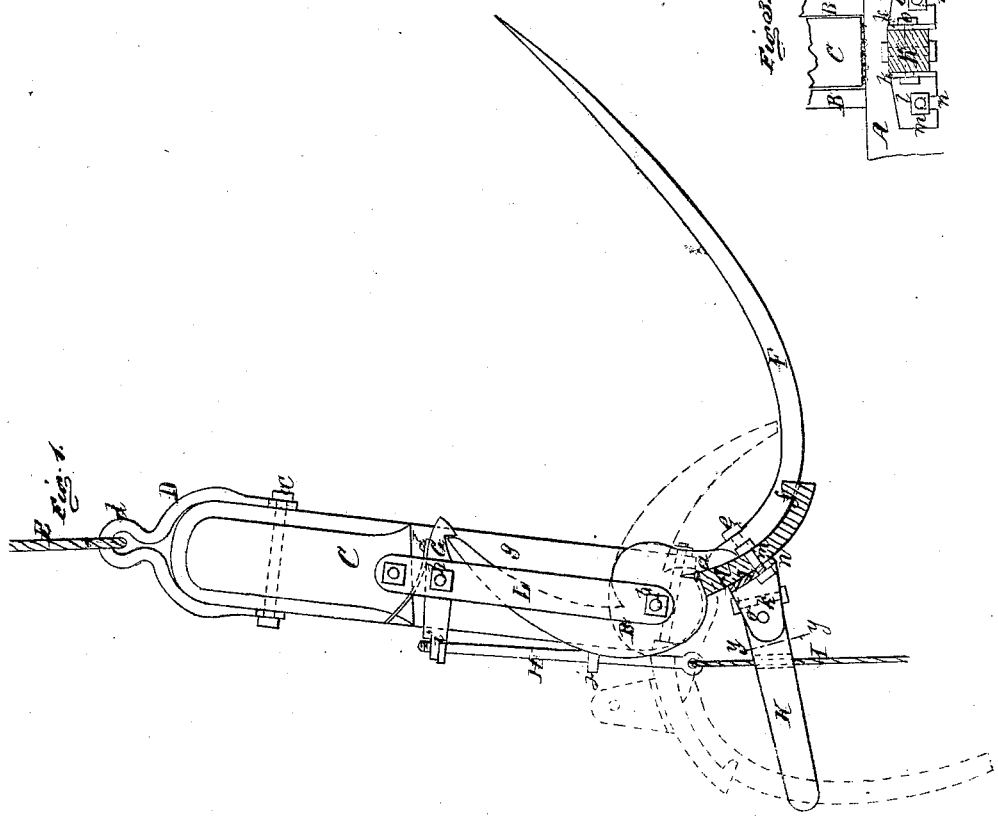
Witnesses.
Henry Morris
Geo. W. Reed
Inventor:
J. L. Wells
per Munn & Co.
Attorneys

UNITED STATES PATENT OFFICE.

J. L. WELLS, OF STOCKBRIDGE, NEW YORK.

IMPROVEMENT IN HORSE HAY-FORKS.

Specification forming part of Letters Patent No. 44,682, dated October 11, 1864.

*To all whom it may concern:*

Be it known that I, J. L. WELLS, of Stockbridge, in the county of Madison and State of New York, have invented a new and Improved Horse Hay-Fork; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a front view of the same; Fig. 3, a back view of a portion of the same, the handle being in section, as indicated by the line $y\,y$.

Similar letters of reference indicate corresponding parts in the several figures.

This invention relates to a new and improved mode of constructing the fork generally, whereby great strength is obtained, the load readily discharged from the fork, and the device rendered capable of being easily managed by the operator.

To enable those skilled in the art to fully understand and construct my invention, I will proceed to describe it.

A represents the head of the fork, which is of cast-iron and of concave form, with four sides, the front and back ends being parallel with each other and the sides oblique, so that the front end of the head will be wider than the back end, as shown in Fig. 2. This head has two arms, B B, cast with it, and extending upward from its back end in slightly-curved form, as shown in Fig. 1, the lower parts of the arms being of circular form and provided with projecting ears $a$, which lap over the back of the head, insuring firmness and strength.

C is a beam of wood, the lower part of which is secured between the lower parts of the two arms B B by a bolt, $b$, on which the arms are allowed to turn freely. The upper end of the beam C has a bail, D, attached to it by a bolt, $c$, said bail being provided with an eye, $d$, at its upper end, in which a hoisting-rope, E, is secured.

To the concave side of the fork-head A there are attached a series of tines, F, the inner parts of which are of curved form corresponding to the curvature of the head A. The back parts of the tines are secured to the head A by screw-bolts $e$, and said tines are fitted in notches $f$ at the front of and cast with the head. These notches prevent any lateral movement of the tines, and they are secured to the head so as to have a flaring position. The tines project a considerable distance beyond the head A, and their outer parts are but slightly curved, and project upward, as shown clearly in Fig. 1.

The beam C has a recess, $g$, made in each side of it, extending from its lower end upward to points above the arms B B. These recesses receive the arms B.

G G are catches, which are secured to the beam C by a bolt, $h$. These catches extend from a bar, $i$, at the rear of the beam, to which a rod, H, is connected, said rod passing through a guide, $j$, at the rear of the beam C, and having a rope, I, attached to its lower end.

J J are springs, which are attached to the beam C and bear upon the catches G G, having a tendency to keep the same down upon the upper ends of the arms B B, so that the tines F may be kept in a proper working position, as shown in tint in Fig. 1.

K is the handle, which is secured to the back or convex side of the head A as follows: The handle K is of wood, and it is fitted between ears or plates $k\,k$, which project at right angles from lips $l\,l$. These lips $l\,l$ abut against the rear of the head A, and are secured thereto by screw-bolts $m$, which pass through the head A and through slots $n\,n$, made in the lower edge of the lips $l\,l$, as shown clearly in Fig. 3. The handle is secured between the ears or plates $k\,k$ by means of a bolt, $o$.

From the above description it will be seen that the handle K may be detached from the head A by simply loosening the screw-bolts $m$, so that the lips $l\,l$ may be drawn or shoved upward, and handles of different lengths, as may be required, readily attached to the head A.

L L are two metal straps, which are secured by the bolts $b\,h$, one to each side of the beam C, and at the outer sides of the arms B B. These straps retain the arms B in proper position, and also strengthen the bolt $b$.

The fork, with its load, is hoisted in the usual way, and when the load is elevated to the desired point the operator or attendant, by pulling the rope I, releases the arms B B from the catches G G, and the fork immediately drops under its own gravity, in connection with that of the load upon it, as shown in red in Fig. 1, and the latter is discharged. When the load is discharged the fork is lowered by backing the horse, and the fork inserted in the hay, the beam C shoved up so that the catches G will engage with the tops of the arms B, and a succeeding load elevated and discharged, as before.

Having thus described my invention, what I claim as new, and desire to secure by Letters Patent, is—

1. The curved or concave cast-iron head A, provided with the arms B B, to operate in connection with the catches G G and beam C, substantially as and for the purpose set forth.

2. Attaching the tines F to the head A by means of the bolts $e$ and notches $f$, as described.

3. The straps L L, attached to the beam C, as shown, when used in combination with the arms B B and beam C, substantially as and for the purpose set forth.

J. L. WELLS.

Witnesses:
 ADELBERT N. SMITH,
 LEWIS F. PEET.